No. 802,666. PATENTED OCT. 24, 1905.
C. STIELER.
APPARATUS FOR MOLDING CONCRETE STRUCTURES.
APPLICATION FILED JULY 19, 1905.
2 SHEETS—SHEET 1.
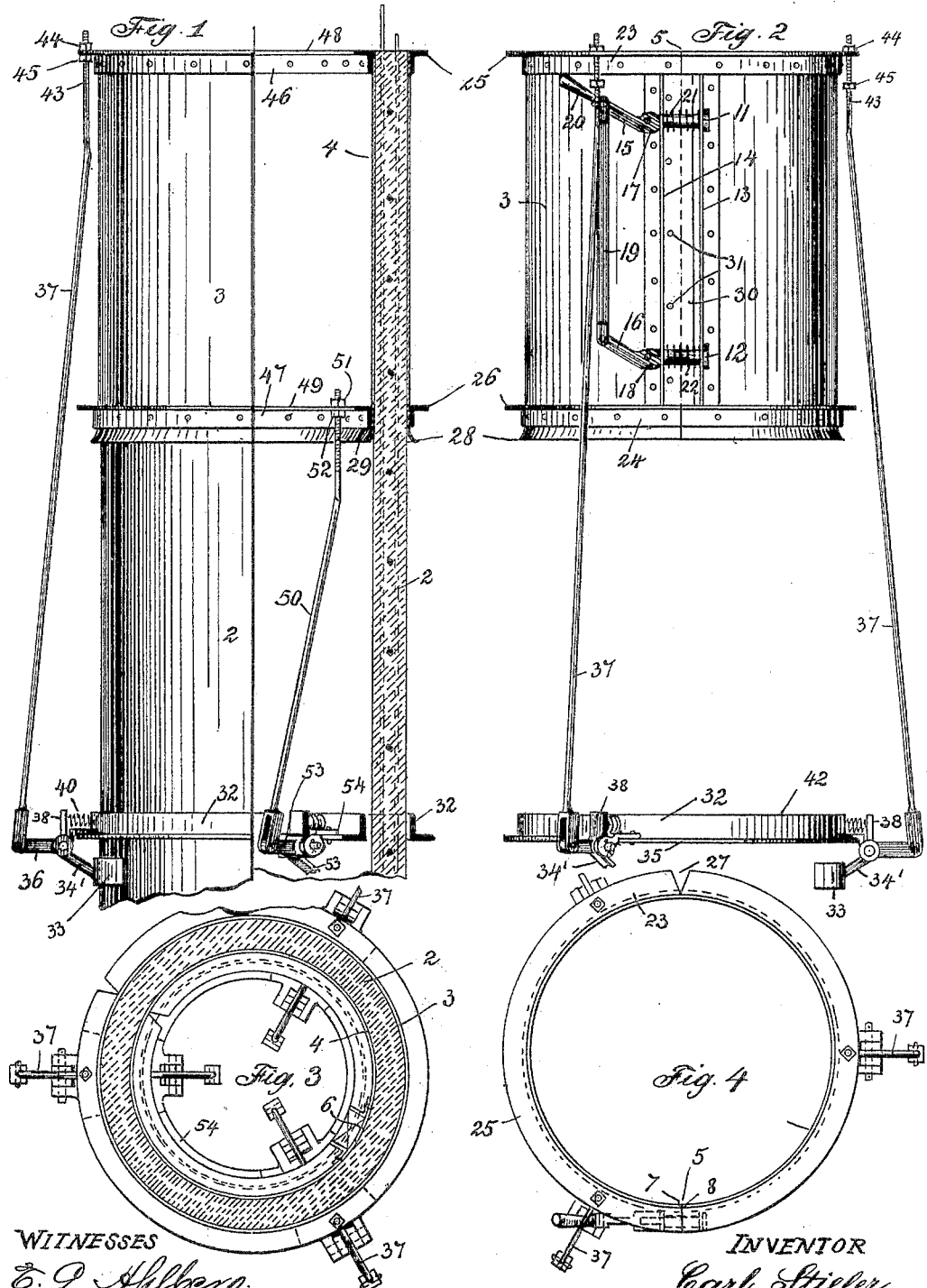
WITNESSES
INVENTOR
Carl Stieler
By Robt. Klotz
Atty.

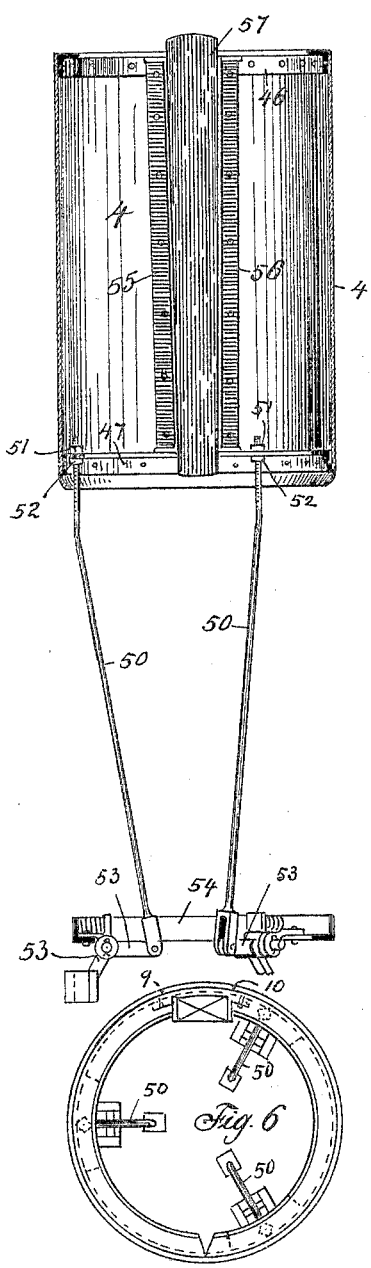

UNITED STATES PATENT OFFICE.

CARL STIELER, OF CHICAGO, ILLINOIS.

APPARATUS FOR MOLDING CONCRETE STRUCTURES.

No. 802,666.　　　Specification of Letters Patent.　　　Patented Oct. 24, 1905.

Application filed July 19, 1905. Serial No. 270,359.

*To all whom it may concern:*

Be it known that I, CARL STIELER, a subject of the German Emperor, and a resident of Chicago, in the county of Cook and State of Illinois, have invented certain new and useful Improvements in Apparatus for Molding Concrete Structures, of which the following is a specification.

This invention relates to molds, and has particular reference to molds for columns, pillars, smoke-stacks, and similar structures.

The general object of the invention is to facilitate the molding of smoke-stacks and the like by providing inner and outer mold-walls which may be successively raised without taking them apart and which may be firmly supported and readily adjusted upon previously-constructed wall-sections.

Another object is to provide elastic mold-walls which will release themselves from a newly-formed cast through their own elasticity.

A still further object of the invention is to provide substantially instantaneously-acting mechanisms for securing the mold-walls to or releasing them from the molded structure.

With the above and such other objects as will appear in the following description in view my invention consists in the novel construction and arrangement of parts hereinafter described in detail, illustrated in the drawings, and incorporated in the claims.

In the drawings, Figure 1 is a view in elevation showing a section of molded smoke-stack partly broken away with my apparatus in position thereupon, said apparatus being shown partly in section. Fig. 2 shows the outer shell or cylinder or the outer mold-wall forming a part of my invention, together with the supporting mechanism therefor. Figs. 3 and 4 are top plan views, partly broken away, of Figs. 1 and 2, respectively, Fig. 3 including part sectioned out in Fig. 1. Fig. 5 is an elevation of the inner mold wall, shell, or cylinder between which and the outer mold wall, shell, or cylinder the concrete or plastic material is packed in. Fig. 6 is a top plan view of Fig. 5. Figs. 7, 8, 9, and 10 are enlarged detail views.

Referring to the drawings, 2 represents a cylindrical concrete or cement structure, such as a smoke-stack, water-tank, or stand-pipe, or any other similar structure.

3 represents the outer and 4 the inner shell, cylinder, or wall of the mold or molding apparatus. The shells 3 and 4, as shown in Figs. 3 and 4, are made of cylindrical form, but open at 5 and 6, respectively. The meeting edges 7 and 8 of the outer shell 5 are normally spaced apart, so as to permit contraction of said outer shell. The inner shell 4, on the other hand, has its meeting edges 9 and 10 normally in touch, and said edges are forcibly separated to expand the shell 4. Both shells are made of elastic metal, such as ordinary steel or even iron. Almost any substance is sufficiently elastic for the purpose of shells 3 and 4, and the sizes of the shells, as well as the special purposes for which they are designed, will largely determine the material of which they are to be made. When said shells 3 and 4 are placed in position to serve as mold-walls, the outer shell is first slightly contracted and the inner shell 4 is slightly expanded. When the cast has been formed between the two shells, the forcible restraint is removed from each, with the result that the inner shell contracts and the outer shell expands on account of its own resiliency. In this manner both shells release themselves from the plastic material.

The mechanism for expanding the outer shell 3 is clearly shown in Fig. 2 as consisting of two bolts 11 and 12, which pass through the parallel wings or flanges 13 and 14 of angle-irons riveted to the shell and paralleling edges 7 and 8. Levers 15 and 16, having cams 17 and 18 thereupon, are eccentrically pivoted to the ends of bolts 11 and 12. A connecting-bar 19 is pivoted at its respective ends to levers 15 and 16 and causes same to move together when the handle 20 of lever 15 is manipulated. When the handle 20 is depressed to swing levers 15 and 16 downward, their cams operate against the flange 14 to draw the bolts 11 and 12, and therewith the flange 13, toward the flange 14, thus contracting the shell 3. Springs 21 and 22 are shown coiled around the bolts 11 and 12, which tend to force the edges 7 and 8 apart and expand the shell 3, so that even if said shell is made of non-elastic material the desired expansion thereof may be effected. I prefer to employ said springs, however, whether the shell be made of resilient material or not, to assist in the prompt expansion thereof and obviate the necessity of paying any special attention to the elastic qualities of the shell material. The upper and lower edges of the shell 5 are, like edges 7 and 8, stiffened by means of angle-irons 23 and 24, the latter being in the form of rings riveted to the shell. The horizontal flanges 25 and 26 of angle-irons 23 and 24 are notched, as at 27, Fig. 4, to break the continuity of said flanges and permit the proper expanding and contracting movement of the shell. In Figs. 2 and 10 the edges 7 and 8 are shown in contact, as when the shell is contracted. By lifting the handle 20 said edges will spring apart to a position not shown, but which will be clearly understood from the foregoing description. The extreme lower edge 28 of the body of the shell is flared or bent outwardly. The corresponding edge 29 of the inner shell 3 is flared inwardly for the purpose (clearly shown in Fig. 1) of providing an enlarged opening to receive the top edge of a wall-section and obviating scars upon previously-formed wall-section, which in the course of rapid building of a smoke-stack would not ordinarily have become set or hard enough to resist identation from the lower edges of shells 3 and 4 when the latter are raised or remounted for a new wall layer. When the meeting edges 7 and 8 are separated, the space between them is closed by a plate 30, secured to the outer face of edge 7 by means of rivets 31.

The shell 3 is supported upon the cylindrical wall 2 by means of an angle-iron ring 32, provided with a plurality of friction-shoes 33. The latter are each mounted on levers fulcrumed on brackets 34, riveted or otherwise secured to the horizontal flange 35 of the ring 32. Fig. 7 shows the arrangement of each of said shoes and levers on an enlarged scale. Each of said levers has three arms—namely, the arm labeled 34' and carrying the shoe 33, an arm 36, pivoted to the lower end of a rod 37, and an arm 38, carrying a stud 39, that enters one end of a coiled spring 40. The opposite end of the latter is mounted on a stud 41, held in the upright wing 42 of the ring 32. The spring 40 exerts pressure on the arm 38 and tends to swing the shoe 33 inwardly against the structure 2. The upper end of rod 37 has a threaded portion 43, which passes through a suitable aperture in the wing 25 of the angle-iron 23. Nuts 44 and 45 engage the upper and lower side of flange 25, and by adjusting said nuts the shoe 33 may be swung toward or away from the outer face of the structure 2 to clamp the ring 32 to said structure or release it therefrom or to clamp the structure between the several shoes 33. The shell 3 is thus supported upon the rods 37, and the latter are supported upon the levers 34 and ring 32. After the shell has been mounted upon the structure its alinement with reference to said structure may be adjusted by turning the nuts 44 and 45 on that portion of the ring 23 which requires raising or lowering to make the shell as a whole plumb. The springs 40 are given sufficient tension to cause the shoes 33 to grip the structure 2 firmly enough to support the shell; but the weight of the shell 3 will ordinarily exert enough leverage upon levers 34 to attain the same end, which leverage can be increased by lengthening the arm 36 or decreased by shortening said arm. When the space between shells 3 and 4 has been filled with plastic material and the shell 3 is to be raised so that the lower edge thereof rests against the upper edge of the newly-formed cast, all that is necessary to effect release of the shell is to remove the upper nuts 44 or merely loosen them to allow some play between same and the lower nuts 45. When then the shell is raised so as to cause the flange 25 to move away from nuts 45 and strike the loosened nuts 44, the rods 37 will be lifted and cause the arms 34 to swing the shoes 33 away from the structure. When the shell 3 has been raised to the desired height and its support is again imposed upon the rods 37 through nuts 45, the shoes 33 will be automatically swung inward to grip the structure and support the shell 3, as previously explained. In this manner an automatic safeguard against accidental dropping of the shell 3 is provided. The same principles control shell 4 in its operation and support. Said inner shell is very similar to the outer shell in structure, being provided with upper and lower angle-iron stiffening-ribs 46 and 47 with horizontal flanges 48 and 49, the latter supporting rods 50, which are similar to rods 37 in function. Nuts 51 and 52 perform the same offices as nuts 44 and 45, and a series of levers 53, fulcrumed upon an inner angle-iron ring 54, are constructed and arranged substantially in the same manner as the construction and arrangement shown in the detail view Fig. 7. Substantially the only difference between the mechanism which supports the outer shell 3 and the mechanism that supports the inner shell 4 is that the rods 50 are fastened at their upper ends to the lower rib 49 instead of the upper rib 46, making said rods 50 shorter than the rods 37, and that the inner ring 54 is smaller in diameter or circumference than the outer ring 32. The arrangement for expanding the inner shell is, however, different from the mechanism shown in connection with the outer shell. The inner shell, while also provided with angle-irons which parallel the meeting edges 9 and 10, or nearly parallel said edges, utilizes said angle-irons 55 and 56 to produce a wedge channel for a slightly-tapered board 57. Said angle-irons 55 and 56 are slightly inclined away from each other and to that extent do not parallel the edges 9 and 10. The wings 58 and 59 of said angle-irons project inwardly instead of outwardly, and the tapered board 57 is used merely in the capacity of the levers 15 and 16 to expand the shell 4. The open space between edges 9 and 10 is closed by a strip 60, which conforms to the curvature of the shell 4 and is flush with the shell. The edges 9 and 10 are reinforced by strips 61 and 62, riveted at 63 and 64, said strips extending beyond said edges to provide ledges for the strip 60 to rest upon. While the plate 60 is shown only in cross-section, its appearance in elevation would be substantially similar to the appearance of board 57, with the exception, as shown in cross-section, that the plate 60 serves to make the walls of the shell continuous across the space between its edges, while the board 57 is arranged laterally of said edges. The strips 61 and 62 also extend from top to bottom of shell.

The shell 4 is raised and adjusted upon the structure in substantially the same manner as shell 3, with the exception that the means for expanding shell 4 comprises the board 57 and plate 60. The latter are removed to permit the shell to contract and be released from the structure. A hole 65 is shown in the upper end of plate 60, which affords a means for securing hold upon said plate for the purpose of withdrawing it.

The shoes 33 are each preferably provided with a wood facing 65', upon which is fastened a friction-face of rubber 66 in order to secure both rigidity and ample coefficient of friction.

By providing shells constructed in accordance with my invention same my be adjusted and raised from time to time from the inside of a smoke-stack or similar structure and permits the employment of an interior scaffolding instead of the usual outside scaffold. Where the parts of a shell of ordinary construction are assembled from the inside of the structure, the workman is apt to fall to his death in leaning over the edges of the structure every time the outside shell is readjusted. An interior scaffold is considerably safer and is better supported than an ordinary outside scaffold and can be constructed much more cheaply and with the use of a smaller amount of lumber.

It is obvious that the outer shell, and even in some instances the inner shell, may be used separately. If a solid column is to be molded, the outer shell alone will be employed and has all the elements of independent operation and support. I therefore do not wish to be confined to the combination of the two shells alone nor to the specific details of construction herein shown and described, which are capable of numerous modifications without departing from the spirit of my invention as set forth in the appended claims.

Having thus described my invention, I claim as new and desire to secure by Letters Patent—

1. The combination of a pair of shells arranged to form a continuous mold-chamber therebetween, with means for changing the forms of said shells to cause the adjacent walls thereof to approach, or recede from, each other, and means for supporting said shells upon a cast previously formed therebetween, in such a manner that said shells, or their support, do not rest on top of, or obstruct the space immediately above, said cast.

2. The combination of a pair of shells arranged one within the other to form a ring-like mold-chamber, said shells constructed so that they are resiliently expansible and contractile, means for temporarily expanding the one shell toward the other and contracting the other shell toward said first-mentioned shell, said means being releasable to cause the walls of said shells to move away from each other and a cast formed therebetween and means for raising and supporting said shells progressively upon the cast in such a manner as to provide successive ring-like mold-chambers, each of which is concentric with the cast, said supporting means engaging only vertical surfaces upon the cast.

3. The combination of a pair of shells arranged to form a ring-form mold-chamber therebetween, means for changing the forms of said shells to cause the adjacent walls thereof to approach, or recede from, each other, and a mechanism for each of said shells which supports same through frictional contact with the vertical walls of a cast or structure molded by said shells.

4. The combination, of an inner and an outer shell arranged to form an inclosing cast therebetween, means for temporarily expanding the inner shell, means for temporarily contracting the outer shell, means causing each of said shells to move, at least partly, away from the other shell on release of said temporary expanding and contracting means, a series of lever-operated friction-shoes for supporting each of said shells upon the vertical wall-surfaces of a structure molded by said shells, and means for adjusting, or plumbing, said shells relatively to said friction-shoes and structure.

5. The combination of an outer with an inner shell, each of said shells being in the form of a curved wall the vertical end edges of which substantially meet; a lever-operated mechanism for forcing the edges of said outer shell toward and from each other and thereby, respectively, contract and expand said outer shell; a slightly-tapered board 57, or wall-section, adapted to be interposed between the meeting edges of said inner shell to force same apart and expand said inner shell, the latter being constructed so that it will contract when said wall-section, or board 57, is removed, and means for supporting each of said shells upon the vertical sides of a cast, or molded structure, formed between said shells.

6. A curved wall, or shell, having normally separated meeting edges, said shell constructed to serve as a mold for a column-like structure; a plate arranged to close the opening between said meeting edges without interfering with their movement toward and from each other, a lever-operated mechanism for temporarily contracting said shell during each molding operation and for expanding said shell to release it from a cast formed therewithin, and means for supporting said shell upon vertical surfaces of the cast.

7. A curved wall, or shell, having normally separated meeting edges, means for moving said edges toward and from each other for the purpose of, respectively, contracting and expanding said shell; means for closing the open space between said edges when said shell is expanded, and means for supporting said shell upon the vertical surfaces of a molded structure.

8. An expansible and contractile cast inclosing shell, restraining means for forcibly expanding or contracting said shell; means which cause said shell to resume its normal form on removal of said restraining means; and means which support said shell by frictional contact with the vertical wall or walls of a structure.

9. The combination of an inner and an outer shell arranged to provide an endless mold-chamber therebetween; means causing said outer shell to expand, and means causing said inner shell to contract for the purpose of releasing said shells from a cast formed therebetween; a supporting-ring for each of said shells; a series of levers having brake-shoes thereon arranged to contact with the vertical walls of a structure being molded by said shells; connecting-rods which support said shells upon said rings, and means for adjusting said shells upon said rods.

10. The combination of an outer with an inner shell, said shells arranged to provide a continuous mold-chamber therebetween; means for contracting and expanding the circumferences of said shells; friction-contacts arranged to support said shells on the vertical surfaces of a structure molded by said shells; means whereby the elevation of said shells releases said friction-contacts from fixed engagements with said surfaces, said means being operable by the weights of said shells to hold said friction-contacts in fixed engagements with said surfaces.

In testimony whereof I have hereunto set my hand in the presence of two subscribing witnesses.

CARL STIELER.

Witnesses:
E. G. AHLBERG,
MAX STENGEL.